United States Patent
Tang et al.

(10) Patent No.: US 11,490,342 B2
(45) Date of Patent: Nov. 1, 2022

(54) SIGNAL TRANSMISSION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/337,380

(22) PCT Filed: Sep. 28, 2016

(86) PCT No.: PCT/CN2016/100570
§ 371 (c)(1),
(2) Date: Mar. 27, 2019

(87) PCT Pub. No.: WO2018/058371
PCT Pub. Date: Apr. 5, 2018

(65) Prior Publication Data
US 2020/0053672 A1    Feb. 13, 2020

(51) Int. Cl.
*H04W 56/00*    (2009.01)
*H04W 72/04*    (2009.01)
*H04W 72/00*    (2009.01)

(52) U.S. Cl.
CPC ....... *H04W 56/001* (2013.01); *H04W 72/005* (2013.01); *H04W 72/046* (2013.01); *H04W 72/0453* (2013.01); *H04W 72/0466* (2013.01)

(58) Field of Classification Search
CPC ............. H04W 56/001; H04W 72/005; H04W 72/0453; H04W 72/046; H04W 72/0466;
(Continued)

(56) References Cited

U.S. PATENT DOCUMENTS 9,894,624 B2 *  2/2018  Yu ........................ H04W 72/046
10,244,494 B2 *  3/2019  Yu .......................... H04W 48/12
(Continued)

FOREIGN PATENT DOCUMENTS

CN    103782636 A    5/2014
CN    105453629 A    3/2016
(Continued)

OTHER PUBLICATIONS

International Search Report in international application No. PCT/CN2016/100570, dated Jul. 10, 2017 with translation provided by WIPO.
(Continued)

*Primary Examiner* — Jay P Patel
(74) *Attorney, Agent, or Firm* — Ladas & Parry, LLP

(57) ABSTRACT

The present invention provides a signal transmission method, a network device, a terminal device, and a communication system. The signal transmission method comprises: a network device sends a first synchronization signal of a first cell by using a first been, the first synchronization signal carrying identifier information of the first beam; the network device sends, by using the first beam, a first broadcast message scrambled by means of the identifier information of the first beam; a terminal device receives a first synchronization signal sent by the network device, and obtaining the identifier information of the first beam carried in the first synchronization signal; and the terminal device detects the first broadcast message according to the identifier information of the first beam. The signal transmission method, the network device, the terminal device and the communication system in the present invention, signal transmission quality can be improved.

26 Claims, 3 Drawing Sheets

---

A network device sends a first synchronization signal of a first cell through a first beam, herein, the first synchronization signal carries identity information of the first beam — S210

The network device sends a first broadcast message scrambled with the identity information of the first beam, by using the first beam — S220

(58) Field of Classification Search
CPC .... H04W 16/28; H04W 56/00; H04B 7/0695; H04B 7/0617; H04B 7/0408; H04B 7/0413; H04J 11/0069
See application file for complete search history.

(56) References Cited

U.S. PATENT DOCUMENTS

| | | | | |
|---|---|---|---|---|
| 10,841,050 | B2* | 11/2020 | Liu | H04L 27/2605 |
| 2007/0249402 | A1* | 10/2007 | Dong | H04W 16/28 455/562.1 |
| 2013/0064239 | A1* | 3/2013 | Yu | H04W 72/046 370/350 |
| 2014/0086217 | A1* | 3/2014 | Park | H04L 25/0391 370/335 |
| 2014/0120926 | A1 | 5/2014 | Shin et al. | |
| 2014/0321375 | A1* | 10/2014 | Agiwal | C08J 11/08 370/329 |
| 2015/0173004 | A1* | 6/2015 | Nigam | H04W 56/001 370/331 |
| 2015/0256244 | A1 | 9/2015 | Yu et al. | |
| 2015/0333811 | A1* | 11/2015 | Yu | H04B 7/0617 370/329 |
| 2016/0197659 | A1 | 7/2016 | Yu et al. | |
| 2016/0308637 | A1 | 10/2016 | Frenne et al. | |
| 2017/0273063 | A1 | 9/2017 | Kim et al. | |
| 2017/0311274 | A1* | 10/2017 | Yu | H04W 72/046 |
| 2019/0028222 | A1 | 1/2019 | Frenne et al. | |
| 2019/0239177 | A1 | 8/2019 | Yu et al. | |
| 2021/0013984 | A1 | 1/2021 | Frenne et al. | |
| 2021/0195538 | A1 | 6/2021 | Yu et al. | |

FOREIGN PATENT DOCUMENTS

| | | | | |
|---|---|---|---|---|
| EP | 3185459 | A1 * | 6/2017 | H04B 7/0617 |
| EP | 3185459 | A1 | 6/2017 | |
| EP | 3324697 | A1 | 5/2018 | |
| EP | 3490316 | A1 | 5/2019 | |
| EP | 3506524 | A1 | 7/2019 | |
| JP | 2014524217 | A | 9/2014 | |
| JP | 2014532320 | A | 12/2014 | |
| RU | 2406263 | C2 | 12/2010 | |
| WO | 2015080646 | A1 | 6/2015 | |
| WO | 2016028111 | A1 | 2/2016 | |
| WO | WO-2016086144 | A1 * | 6/2016 | H04W 72/0446 |

OTHER PUBLICATIONS

Written Opinion Opinion of the International Search Authority in international application No. PCT/CN2016/100570, dated Jul. 10, 2017, with translation provided by Google translate.
First Office Action of the Chinese application No. 201680089697.1, dated Mar. 19, 2020.
First Office Action of the European application No. 16917126.1, dated Apr. 17, 2020.
First Office Action of the Canadian application No. 3038565, dated Apr. 16, 2020.
Written Opinion of the Singaporean application No. 11201902791V, dated Apr. 16, 2020.
Notice of Allowance of the Russian application No. 2019112374, dated May 20, 2020.
Supplementary European Search Report in the European application No. 16917126.1, dated Jun. 25, 2019.
English translation of the Written Opinion of the International Search Authority in the international application No. PCT/CN2016/100570, dated Jul. 10, 2017.
First Office Action of the Russian application No. 2019112374, dated Jan. 30, 2020.
First Office Action of the Chilean application No. 201900817, dated Nov. 19, 2019.
First Office Action of the Brazillian application No. BR1120190061177, dated Sep. 8, 2020.
Fujitsu, Discussion on initial access in NR, 3GPP TSG RAN WG1#86 R1-166678,3GPP,Aug. 12, 2016.
Huawei, HiSilicon, Access mechanism for beam based approach, 3GPP TSG-RAN WG1#86 R1-166088, 3GPP, Aug. 12, 2016.
First Office Action of the Japanese application No. 2019-516575, dated Aug. 11, 2020.
Second Office Action of the Chinese application No. 201680089697.1, dated Jul. 7, 2020.
Third Office Action of the Chinese application No. 201680089697.1, dated Sep. 15, 2020.
InterDigital Communications. "On Beam-based Initial Access for NR". 3GPP TSG RAN WG1 Meeting #86 R1-167574 Gothenburg, Sweden Aug. 22-26, 2016.
Second Written Opinion of the Singaporean application No. 11201902791V, dated Feb. 22, 2021.
Office Action of the Indian application No. 201917015566, dated Jan. 31, 2021.
Second Office Action of the Canadian application No. 3038565, dated Jan. 22, 2021.
First Office Action of the Israeli application No. 265673, dated Dec. 2, 2020.
First Office Action of the Taiwanese application No. 106129440, dated Jan. 29, 2021.
Supplementary European Search Report in the European application No. 21177691.9, dated Jul. 8, 2021.
Third Office Action of the Canadian application No. 3038565, dated Oct. 21, 2021.
First Office Action of the Japanese application No. 2021-000133, dated Jan. 21, 2022.
Second Office Action of the Israeli application No. 265673, dated Jan. 16, 2022.
First Office Action of the Indonesian application No. PID201903493, dated Dec. 8, 2021.
First Office Action of the Mexican application No. MX/a/2019/003661, dated May 24, 2022.

* cited by examiner

SIGNAL TRANSMISSION METHOD, NETWORK DEVICE, AND TERMINAL DEVICE

CROSS-REFERENCE TO RELATED APPLICATION

The present application is the U.S. national phase application of PCT Application No. PCT/CN2016/100570 filed on Sep. 28, 2016, the disclosure of which is incorporated herein in its entirety by reference.

TECHNICAL FIELD

The disclosure relates to the field of wireless communications, and more particularly to a method for transmitting a signal, a network device and a terminal device.

BACKGROUND

A Multiple-Input Multiple-Output (MIMO) technology is one of the core technologies of a Long Term Evolution (LTE) system, which can greatly increase the transmission rate of the system. Beamforming is a signal preprocessing technology based on an antenna array. A beam with directivity is generated by adjusting the weight of a signal sent on each antenna array element.

In the related art, the transmission of a cell common signal (such as a synchronization signal and a broadcast message) can only be transmitted through at most one beam, and sufficient beamforming gains cannot be obtained, which affects the quality of signal transmission.

SUMMARY

The disclosure provides a method for transmitting a signal, a network device, a terminal device and a communication system, which can improve the signal transmission quality.

In a first aspect, the disclosure provides a method for transmitting a signal, which includes: a network device sends a first synchronization signal of a first cell through a first beam, herein, the first synchronization signal carries identity information of the first beam; and the network device sends a first broadcast message scrambled with the identity information of the first beam, through the first beam.

In the method for transmitting the signal, the network device may send the identity information of a beam in a cell through a synchronization signal, and scramble a broadcast message corresponding to the synchronization signal with the identity information of the beam. Since a terminal device may acquire an identity of a beam through a synchronization signal sent by the network device and detect a corresponding broadcast message according to the identity of the beam, the method for transmitting the signal enables a common signal to be transmitted through multiple beams in a cell, thereby obtaining a beamforming gain, and finally improving the signal transmission quality.

In a possible implementation manner, the first broadcast message carries at least one of: relationship information between a radio resource occupied by the first synchronization signal and a radio resource occupied by the first broadcast message, identity information of at least one second beam in the first cell, information of a radio resource occupied by a second synchronization signal sent through the at least one second beam in the first cell, a total number of beams in the first cell, or information of a radio resource occupied by a second broadcast message sent through the at least one second beam in the first cell.

In the method for transmitting the signal, the network device may carry information related to a second beam in the sent first broadcast message, the information may be, for example, an identity of the second beam, resource information of a synchronization signal corresponding to the second beam, and resource information of a broadcast message corresponding to the second beam, so that the terminal device may further detect the first broadcast message after detecting the first synchronization signal, and then detect the second beam, a second synchronization signal, a second broadcast message or the like according to the first broadcast message. Thus, as long as the terminal device detects one beam, information of other beams can be sequentially acquired, the detection speed of a beam in a cell by the terminal device can be increased finally.

In a possible implementation manner, the first broadcast message carries identity information of the first cell.

In the method for transmitting the signal, a broadcast message carries identity information of a corresponding cell, so that the terminal device may acquire an identity of the cell from the broadcast message, thereby speeding up the detection of the cell identity by the terminal device.

In a second aspect, the disclosure provides a method for transmitting a signal, which includes: a terminal device detects a first synchronization signal in a first cell, herein, the first synchronization signal carries identity information of a first beam for sending the first synchronization signal; and the terminal device detects a first broadcast message sent through the first beam, according to the identity information of the first beam.

In the method for transmitting the signal, a synchronization signal received by the terminal device from a network device carries identity information of a beam in a cell. Thus, after acquiring an identity of a beam through a synchronization signal sent by the network device, the terminal device may detect a corresponding broadcast message according to the identity of the beam, so that the method for transmitting the signal enables a common signal to be transmitted through multiple beams in a cell, thereby obtaining a beamforming gain, and finally improving the signal transmission quality.

In a possible implementation manner, the first broadcast message carries at least one piece of information of: first relationship information between a radio resource occupied by the first synchronization signal and a radio resource occupied by the first broadcast message, identity information of at least one second beam in the first cell, information of a radio resource occupied by a second synchronization signal sent through the at least one second beam in the first cell, a total number of beams in the first cell, or information of a radio resource occupied by a second broadcast message sent through the at least one second beam in the first cell.

In the method for transmitting the signal, a first broadcast message received by the terminal device from the network device carries information related to a second beam, such as an identity of the second beam, resource information of a synchronization signal corresponding to the second beam, and resource information of a broadcast message corresponding to the second beam, so that the first broadcast message may be further detected after the first synchronization signal is detected, and then the second beam, a second synchronization signal, a second broadcast message or the like may be detected according to the first broadcast message. Thus, as long as the terminal device detects one beam, information of other beams can be sequentially acquired, the detection speed of a beam in a cell by the terminal device can be increased finally.

In a possible implementation manner, the method for transmitting the signal may further include: the terminal device determines the identity information of the at least one second beam according to the at least one piece of information.

In the method for transmitting the signal, as long as the terminal device detects a broadcast message corresponding to one beam, information of other beams can be sequentially acquired, the detection speed of a beam in a cell by the terminal device can be increased finally.

In a possible implementation manner, the first broadcast message carries identity information of the first cell.

In the method for transmitting the signal, a broadcast message carries identity information of a corresponding cell, so that the terminal device may acquire an identity of the cell from the broadcast message, thereby speeding up the detection of the cell identity by the terminal device.

In a possible implementation manner, the terminal device detects the first broadcast message according to the identity information of the first beam may include: the terminal device determines M radio resources to be detected according to a radio resource occupied by the first synchronization signal and a first relationship information set, herein, the first relationship information set includes M pieces of relationship information, $i^{th}$ relationship information in the first relationship information set is used to indicate a relationship between a radio resource occupied by a synchronization signal sent through the first beam and a radio resource occupied by a broadcast message sent through the first beam, in an $i^{th}$ cell of M cells, a relationship between an $i^{th}$ radio resource to be detected of the M radio resources to be detected and the radio resource occupied by the first synchronization signal is the relationship indicated by the $i^{th}$ relationship information in the first relationship information set, M is a positive integer, i is a positive integer less than or equal to M, and the M cells include the first cell; the terminal device descrambles N broadcast messages on the M radio resources to be detected with the identity information of the first beam, herein, N is a positive integer less than or equal to M; and the terminal device detects the first broadcast message from K broadcast messages descrambled successfully, herein, K is a positive integer less than or equal to N.

In the method for transmitting the signal, the terminal device may determine, according to an identity of a beam in a synchronization signal received from the network device and resource information used by the synchronization signal as well as a relationship between a resource used by the synchronization signal and a resource used by a broadcast message corresponding to the synchronization signal, the broadcast message corresponding to the synchronization signal.

Optionally, the resource information may include time domain resource information or frequency domain resource information, and may specifically be at least one of a location of a time domain resource used by a synchronization signal or a location of a frequency domain resource used by the synchronization signal. A relationship between a resource used by the synchronization signal and a resource used by a broadcast message corresponding to the synchronization signal may specifically be at least one of: an offset between a location of a time domain resource used by the synchronization signal and a location of a time domain resource used by the broadcast message, or an offset between a location of a frequency domain resource used by the synchronization signal and a location of a frequency domain resource used by the broadcast message.

In a possible implementation manner, K=1, where the terminal device detects the first broadcast message from K broadcast messages descrambled successfully may include: the terminal device determines a broadcast message descrambled successfully as the first broadcast message.

In a possible implementation manner, K>1, where a $j^{th}$ broadcast message of the K broadcast messages carries relationship information between a radio resource occupied by the $j^{th}$ broadcast message and a radio resource occupied by a synchronization signal sent through the first beam in a cell where the $j^{th}$ broadcast message is located, herein, j is a positive integer less than or equal to K; and the terminal device detects the first broadcast message from K broadcast messages descrambled successfully may include: the terminal device determines a third broadcast message of the K broadcast messages as the first broadcast message, herein, a relationship between a radio resource occupied by the third broadcast message and the radio resource occupied by the first synchronization signal is the relationship information carried in the third broadcast message.

By means of the method for transmitting the signal, when the same beam corresponds to multiple broadcast messages, a broadcast message corresponding to a synchronization signal may be determined according to a relationship between a resource used by a synchronization signal and a resource used by a broadcast message, which is carried in the broadcast message and a relationship between a resource used by a synchronization signal detected by the terminal device and a resource used by a broadcast message that is currently detected.

In a possible implementation manner, the first relationship information set is a pre-configured relationship information set.

In a third aspect, the disclosure provides a network device. The network device includes a module for performing the method for transmitting the signal in the first aspect or any one possible implementation manner in the first aspect.

In a fourth aspect, the disclosure provides a terminal device. The terminal device includes a module for performing the method for transmitting the signal in the second aspect or any one possible implementation manner in the second aspect.

In a fifth aspect, the disclosure provides a communication system, which includes at least one of the network device in the third aspect or the terminal device in the fourth aspect.

In a sixth aspect, the disclosure provides a network device, which includes a transceiver, a processor and a memory. The memory is configured to store a code. The processor is configured to execute the code in the memory. The transceiver is configured to communicate with other devices. When the code is executed, the processor calls the transceiver to implement the method for transmitting the signal in the first aspect or any one possible implementation manner in the first aspect.

In a seventh aspect, the disclosure provides a terminal device, which includes a transceiver, a processor and a memory. The memory is configured to store a code. The processor is configured to execute the code in the memory. The transceiver is configured to communicate with other devices. When the code is executed, the processor calls the transceiver to implement the method for transmitting the signal in the second aspect or any one possible implementation manner in the second aspect.

In an eighth aspect, the disclosure provides a communication system, which includes at least one of the network device in the sixth aspect or the terminal device in the seventh aspect.

In a ninth aspect, the disclosure provides a computer readable medium. The computer readable medium stores a program code executed by a network device. The program code includes an instruction for performing the method for transmitting the signal in the first aspect or any one possible implementation manner in the first aspect.

In a tenth aspect, the disclosure provides a computer readable medium. The computer readable medium stores a program code executed by a terminal device. The program code includes an instruction for performing the method for transmitting the signal in the second aspect or any one possible implementation manner in the second aspect.

BRIEF DESCRIPTION OF DRAWINGS

In order to more clearly illustrate the technical solutions of the embodiments of the disclosure, the drawings to be used in the embodiments of the disclosure will be briefly introduced below. It is apparent that the drawings described below are only some embodiments of the disclosure. Those skilled in the art can also obtain other drawings based on these drawings without paying any creative work.

DETAILED DESCRIPTION

In order to make the objectives, technical solutions and advantages of the embodiments of the disclosure clearer, the technical solutions in the embodiments of the disclosure will be clearly and completely described below with reference to the drawings in the embodiments of the disclosure. It is apparent that the described embodiments are only part of the embodiments of the disclosure, not all of the embodiments. On the basis of the embodiments of the disclosure, all other embodiments obtained on the premise of no creative work of those of ordinary skill in the art fall within the scope of protection of the disclosure.

For ease of understanding, an exemplary diagram of architecture of a communication system capable of implementing a method for transmitting a signal according to an embodiment of the disclosure will be described as a whole first. It is to be understood that the embodiments of the disclosure are not limited to a system architecture illustrated in FIG. 1. In addition, a device in FIG. 1 may be hardware, functionally divided software, or a combination of the hardware and software.

Figure 1:
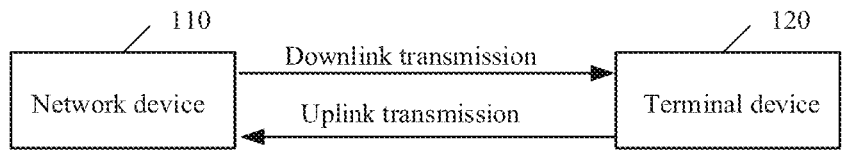
FIG. 1 is a schematic structure diagram of a system applicable to a method for transmitting a signal according to an embodiment of the disclosure.

Some examples of a wireless communication system illustrated in FIG. 1 may be an LTE system, a Wideband Code Division Multiple Access (WCDMA) system, or a future 5G system.

The wireless communication system described in FIG. 1 may include a network device 110 and a terminal device 120, and the network device 110 and the terminal device 120 may communicate with each other. The network device 110 may be configured to access the terminal device 120 to the wireless communication network.

In the embodiments of the disclosure, a specific example of a network device 110 is a base station, such as a Base Transceiver Station (BTS) in a Global System for Mobile communication (GSM) or a Code Division Multiple Access (CDMA) system, a Node B in a WCDMA system, an Evolutional Node B (eNB or eNodeB) in an LTE system, or a base station device, a small base station device and the like in a future 5G network, which are not limited by the disclosure.

In the embodiments of the disclosure, the terminal device 120 may also be generally referred to as a User Equipment (UE). The terminal device may communicate with one or more core networks via a Radio Access Network (RAN). The terminal device may also be called an access terminal, a user unit, a user station, a mobile radio station, a mobile station, a remote station, a remote terminal, a mobile device, a user terminal, a terminal, a wireless communication device, a user agent, or a user device. The terminal device may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an in-vehicle device, a wearable device, and a terminal device in a future 5G network.

The network device 110 may transmit a downlink signal to the terminal device 120 through one or more shaped beams, and the terminal device 120 may receive the downlink signal sent by the network device 110 through an omni-directional shaped beam or a directional shaped beam.

The network device 110 transmits a downlink signal to the terminal device 120 through multiple shaped beams, so that when the signal is transmitted between the network device 110 and the terminal device 120, a greater gain can be obtained, and the gain of signal transmission is improved. When the network device 110 transmits a downlink signal to the terminal device 120 through multiple shaped beams, an identity needs to be defined for different shaped beams, so that the network device 110 and the terminal device 12.0 may distinguish different shaped beams.

For this, the disclosure provides a method for transmitting a signal, which can transmit identity information of a shaped beam, so that the terminal device and the network device may distinguish different shaped beams, thereby implementing transmission of multiple shaped beams between the network device and the terminal device, and improving the signal transmission quality.

Figure 2:
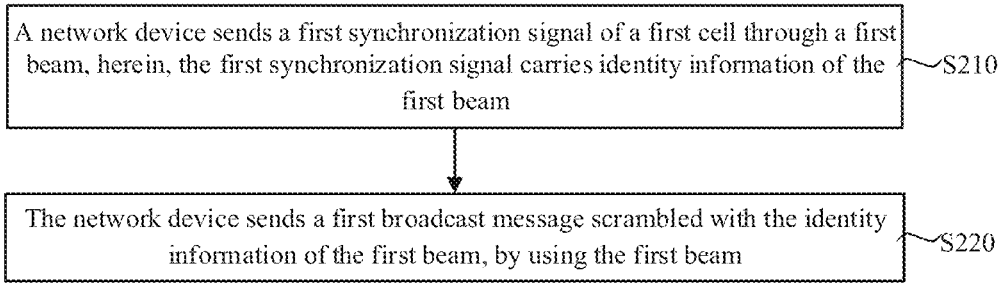
FIG. 2 is a schematic flowchart of a method for transmitting a signal according to an embodiment of the disclosure.

FIG. 2 is a schematic flowchart of a method for transmitting a signal according to an embodiment of the disclosure. It is to be understood that FIG. 2 illustrates the operations of the method for transmitting the signal, but these operations are merely examples, and embodiments of the disclosure may also perform other operations or variations of various operations in FIG. 2. Moreover, various operations in FIG. 2 may be performed in a different order than that presented in FIG. 2, and it is possible that not all operations in FIG. 2 are to be performed. A network device in FIG. 2 corresponds to the network device 110 in FIG. 1.

At S210, a network device sends a first synchronization signal of a first cell through a first beam, herein, the first synchronization signal carries identity information of the first beam.

Specifically, the network device may send a synchronization signal on at least one of a certain time resource or a certain frequency resource. The synchronization signal sent by the network device may be selected from some preset sequences, such as a certain length of ZC sequence. Different sequences correspond to different shaped beam Identities (IDs). For example, the synchronization signal may be selected from a sequence set containing 8 sets of sequences, sequence 1 corresponds to an identity of a shaped beam, sequence 2 corresponds to an identity of a second shaped beam, and so on, 8 sets of sequences may correspond to identities of 8 shaped beams.

At S220, the network device sends a first broadcast message scrambled with the identity information of the first beam, through the first beam.

Specifically, the network device scrambles the first broadcast message with the identity of the first beam, and then sends the first broadcast message through the first beam.

Figure 3:
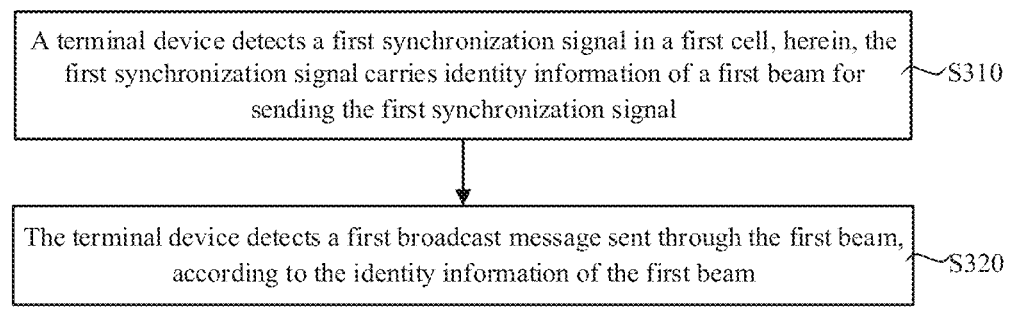
FIG. 3 is a schematic flowchart of a method for transmitting a signal according to an embodiment of the disclosure.

Correspondingly, a schematic flowchart of a method for transmitting a signal which is performed by a terminal device is illustrated in FIG. 3. It is to be understood that FIG. 3 illustrates the operations of the method for transmitting the signal, but these operations are merely examples, and embodiments of the disclosure may also perform other operations or variations of various operations in FIG. 3. Moreover, various operations in FIG. 3 may be performed in a different order than that presented in FIG. 3, and it is possible that not all operations in FIG. 3 are to be performed. The terminal device in FIG. 3 may correspond to the terminal device 120 in FIG. 1.

At S310, a terminal device detects a first synchronization signal in a first cell, herein, the first synchronization signal carries identity information of a first beam for sending the first synchronization signal.

At S320, the terminal device detects a first broadcast message sent through the first beam, according to the identity information of the first beam.

In the embodiments of the disclosure, the network device sends the identity information of a beam in a cell through a synchronization signal, and scrambles a broadcast message corresponding to the synchronization signal with the identity information of the beam. Then, the terminal device may acquire the identity of the beam through the synchronization signal sent by the network device and detect the corresponding broadcast message according to the identity of the beam. Thus, the method for transmitting the signal enables a common signal to be transmitted through multiple beams in a cell, thereby obtaining a beamforming gain, and finally improving the signal transmission quality.

In the method for transmitting the signal, optionally, the first broadcast message may carry identity information of the first cell.

When a broadcast message carries identity information of a corresponding cell, the terminal device may acquire an identity of the cell from the broadcast message, thereby speeding up the detection of the cell identity by the terminal device.

In the method for transmitting the signal, optionally, the first broadcast message may carry at least one piece of information of: relationship information between a first radio resource occupied by the first synchronization signal and a second radio resource occupied by the first broadcast message, identity information of at least one second beam in the first cell, information of a third radio resource occupied by a second synchronization signal sent through the at least one second beam in the first cell, a total number of beams in the first cell, or information of a fourth radio resource occupied by a second broadcast message sent through the at least one second beam in the first cell.

When the at least one piece of information is carried in the first broadcast message sent by the network device to the terminal device, the terminal device may determine the identity information of the at least one second beam according to the at least one piece of information.

If the network device sends the identity information of one or more other beams in the first cell to the terminal device in the first broadcast message, the terminal device may acquire the identity information of the other beams after detecting the first broadcast message. If the network device sends information of resources occupied by synchronization signals corresponding to one or more other beams in the first cell to the terminal device in the first broadcast message, the terminal device may, after detecting the first broadcast message, detect the synchronization signals according to the information of the resources of the synchronization signals carried in the first broadcast message, thus acquiring the identity information of other beams carried in the synchronization signals. If the network device sends information of resources used by broadcast messages corresponding to one or more other beams in the first cell to the terminal device in the first broadcast message, the terminal device may, after detecting the first broadcast message, detect these broadcast messages according to the information of the resources of these broadcast messages, thus acquiring the identity information of the corresponding beams.

In general, the network device may carry information related to a second beam in the first broadcast message that is sent, so that the terminal device may further detect the first broadcast message after detecting the first synchronization signal, and then detect the second beam, a second synchronization signal, a second broadcast message or the like according to the first broadcast message. Thus, as long as the terminal device detects one beam, information of other beams can be sequentially acquired, the detection speed of a beam in a cell by the terminal device can be increased finally, Optionally, the information of the radio resource may include time domain resource information or frequency domain resource information, and may specifically be at least one of a location of a time domain resource used by a synchronization signal or a broadcast message, or a location of a frequency domain resource used by the synchronization signal or the broadcast message. Relationship information between a resource used by a synchronization signal and a resource used by a broadcast message corresponding to the synchronization signal may specifically be at least one of an offset between a location of a time domain resource used by the synchronization signal and a location of a time domain resource used by the broadcast message, or an offset between a location of a frequency domain resource used by the synchronization signal and a location of a frequency domain resource used by the broadcast message.

In addition, if the first broadcast message carries the total number of all shaped beams in the first cell, the terminal device may determine, according to the total number of all shaped beams, whether all the shaped beams in the cell have been detected, thereby further increasing the detection speed of beams in a cell.

According to the method for transmitting the signal which is performed by the terminal device, it can be seen that after the terminal device receives the first synchronization signal sent by the network device, the terminal device detects the first broadcast message according to the identity information of the first beam carried in the first synchronization signal. A specific implementation manner in which the terminal device detects the first broadcast message according to the identity information of the first beam carried in the first synchronization signal is as follows.

The terminal device may determine M radio resources to be detected according to a radio resource occupied by the first synchronization signal and a first relationship information set. Then, the terminal device descrambles N broadcast messages on the M radio resources to be detected with the identity information of the first beam, and the terminal device detects the first broadcast message from K broadcast messages descrambled successfully.

The first relationship information set includes M pieces of relationship information, $i^{th}$ relationship information in the first relationship information set is used to indicate a relationship between a radio resources occupied by a synchronization signal sent through the first beam and a radio resource occupied by a broadcast message sent through the first beam, in an $i^{th}$ cell of M cells, and a relationship between an $i^{th}$ radio resource to be detected of the M radio resources to be detected and the radio resource occupied by the first synchronization signal is the relationship indicated by the $i^{th}$ relationship information in the first relationship information set. M cells include the first cell, M is a positive integer, i is a positive integer less than or equal to M, N is a positive integer less than or equal to M, and K is a positive integer less than or equal to N.

In the method for transmitting the signal, the terminal device may determine, according to an identity of a beam in a synchronization signal received from the network device and resource information used by the synchronization signal as well as a relationship between the resource used by the synchronization signal and a resource used by a broadcast message corresponding to the synchronization signal, the broadcast message corresponding to the synchronization signal.

When K=1, that is, there is a broadcast message descrambled successfully after the terminal device descrambles N broadcast messages on the M radio resources to be detected with the identity information of the first beam, the terminal device may determine a broadcast message descrambled successfully as the first broadcast message.

Optionally, after the terminal device descrambles N broadcast messages on the M radio resources to be detected with the identity information of the first beam, there may be multiple broadcast messages descrambled successfully, that is, K>1. If broadcast messages of multiple cells are transmitted on the first beam, there may be multiple broadcast messages descrambled successfully by the terminal device with the identity of the first beam. In this case, it is necessary to further determine the broadcast message corresponding to the first synchronization signal from the K broadcast messages according to relationship information between a radio resource occupied by a broadcast message and a radio resource occupied by a synchronization signal sent through the first beam in a cell where the broadcast message are located, carried in each of the K broadcast messages descrambled successfully.

Specifically, in the K broadcast messages descrambled successfully by the terminal device, a $j^{th}$ broadcast message may carry relationship information between a radio resource occupied by the $j^{th}$ broadcast message and a radio resource occupied by a synchronization signal sent through the first beam in a cell where the $j^{th}$ broadcast message is located, herein, j is a positive integer less than or equal to K. Then, if relationship information between a radio resource occupied by a certain broadcast message and a radio resource occupied by a synchronization signal actually corresponding to the certain broadcast message, carried in the certain broadcast message of the K broadcast messages is a relationship between a radio resource actually occupied by the certain broadcast message and the radio resource occupied by the first synchronization signal, the terminal device determines the certain broadcast message as the first broadcast message. Correspondingly, a broadcast message sent to the terminal device by the network device through a beam may carry relationship information between a radio resource occupied by the broadcast message and a radio resource occupied by a synchronization signal sent through the beam in a cell where the broadcast message is located.

That is to say, in the embodiments of the disclosure, a broadcast message sent to the terminal device by the network device through a beam may carry relationship information between a radio resource occupied by the broadcast message and a radio resource occupied by a synchronization signal sent through the beam in a cell where the broadcast message is located, if the same beam corresponds to multiple broadcast messages, a broadcast message corresponding to a synchronization signal may be determined according to a relationship between a resource used by a synchronization signal and a resource used by a broadcast message, carried in the broadcast message and a relationship between a resource used by a synchronization signal detected by the terminal device and a resource used by a broadcast message that is currently detected.

In the embodiments of the disclosure, at least one of a time domain location of or a frequency domain location of a synchronization signal may be preset. Time domain locations of synchronization signals corresponding to different shaped beams may be different, and/or frequency domain locations of synchronization signals corresponding to different shaped beams may be different. Time domain locations of synchronization signals corresponding to the beam having the same beam ID in different cells may also be different, and/or the frequency domain locations of synchronization signals corresponding to the beam having the same beam ID in different cells may also be different. A set is constituted by at least one of: time domain locations of synchronization signals of different cells, frequency domain locations of synchronization signals of different cells, time domain locations of synchronization signals for different beams, or frequency domain locations of synchronization signals for different beams. The set is preset, as preset in the standard.

Similarly, at least one of a time domain location of or a frequency domain location of a broadcast message may also be preset. Time domain locations of broadcast messages corresponding to different beams may also be different, and/or frequency domain locations of broadcast messages corresponding to different beams may also be different. Time domain locations of broadcast messages corresponding to the beam having the same beam ID in different cells may also be different, and/or frequency domain locations of broadcast messages corresponding to the beam having the same beam ID in different cells may also be different. A set is constituted by at least one of: time domain locations of broadcast messages of different cells, frequency domain locations of broadcast messages of different cells, time domain locations of broadcast messages for different beams, or frequency domain locations of broadcast messages for different beams. The set is preset, as preset in the standard.

It is to be noted that a time resource used for a synchronization signal does not overlap with a time resource used for a broadcast message, in the same beam of the same cell, and/or a frequency resource used for a synchronization signal does not overlap with a frequency resource used for a broadcast message, in the same beam of the same cell. Moreover, at least one of the relationship between the time domain resource used by the synchronization signal and the time domain resource used by the broadcast message or the relationship between the frequency domain resource used by the synchronization signal and the frequency domain resource used by the broadcast message may be preset, such as at least one of: an offset between a location of the time domain resource used by the synchronization signal and a location of the time domain location used by the broadcast message, or an offset between a location of the frequency domain used by the synchronization signal and a location of the frequency domain location used by the broadcast message may be preset. A resource relationship set may be constituted by at least one of an offset between the location of the time domain resource used by the synchronization signal and the location of the time domain resource used by the broadcast message or an offset between the location of the frequency domain resource used by the synchronization signal and the location of the frequency domain resource used by the broadcast message. The resource relationship set is preset.

The methods for transmitting the signal according to the embodiments of the disclosure are described above, and a network device, a terminal device and a communication system corresponding to the methods for transmitting the signal are introduced below.

Figure 4:
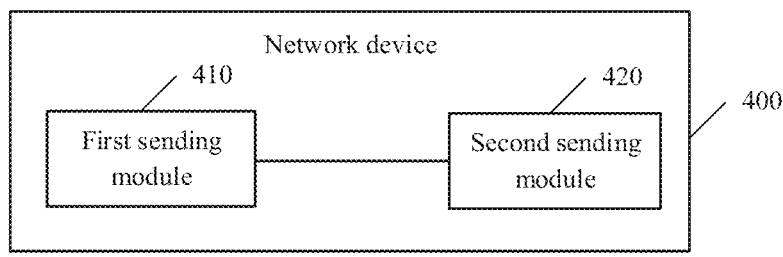
FIG. 4 is a schematic structure diagram of a network device according to an embodiment of the disclosure.

FIG. 4 is a schematic structure diagram of a network device according to an embodiment of the disclosure. It is to be understood that a network device 400 illustrated in FIG. 4 is only an example, and the network device according to an embodiment of the disclosure may further include other modules or units, or include modules functionally similar to those of the modules in FIG. 4, or not including all modules in FIG. 4.

A first sending module 410 is configured to send a first synchronization signal of a first cell through a first beam, herein, the first synchronization signal carries identity information of the first beam.

A second sending module 420 is configured to send a first broadcast message scrambled with the identity information of the first beam, through the first beam.

In the embodiments of the disclosure, the network device may send the identity information of a beam in a cell through a synchronization signal, and scramble a broadcast message corresponding to the synchronization signal with the identity information of the beam. Since the terminal device can acquire an identity of a beam through a synchronization signal sent by the network device and detect a corresponding broadcast message according to the identity of the beam, according to the embodiments, a common signal may be transmitted through multiple beams in a cell, thereby obtaining a beamforming gain, and finally improving the signal transmission quality.

Optionally, as an embodiment, the first broadcast message carries at least one of: relationship information between a first radio resource occupied by the first synchronization signal and a second radio resource occupied by the first broadcast message, identity information of at least one second beam in the first cell, information of a third radio resource occupied by a second synchronization signal sent through the at least one second beam in the first cell, a total number of beams in the first cell, or information of a fourth radio resource occupied by a second broadcast message sent through the at least one second beam in the first cell.

Optionally, as an embodiment, the first broadcast message carries identity information of the first cell.

It is to be understood that the above-mentioned and other operations and/or functions of the respective units in the network device according to an embodiment of the disclosure illustrated in FIG. 4 are respectively intended to implement the corresponding processes performed by the network device in the aforementioned method for transmitting a signal. For brevity, descriptions are not repeated herein.

Figure 5:
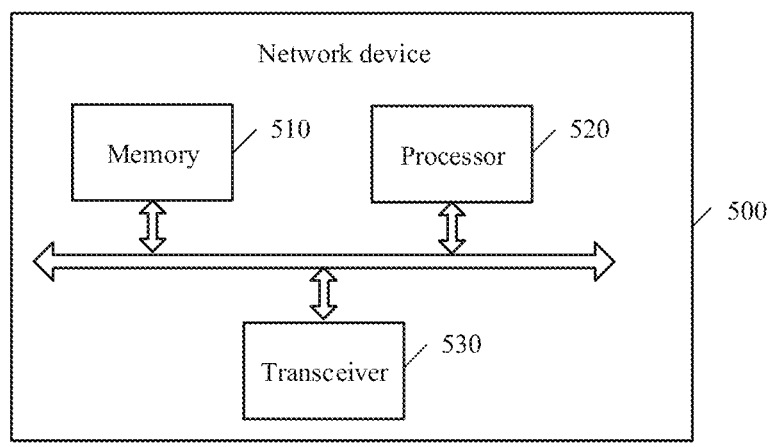
FIG. 5 is a schematic structure diagram of a network device according to an embodiment of the disclosure.

FIG. 5 is a schematic structure diagram of a network device according to an embodiment of the disclosure. The network device 500 includes a memory 510, a processor 520 and a transceiver 530.

The memory 510 is configured to store a program.

The processor 520 is configured to execute the program stored in the memory 510.

When executing the program stored in the memory 510, the processor 520 is specifically configured to send a first synchronization signal of a first cell through a first beam, herein, the first synchronization signal carries identity information of the first beam.

The processor 520 is further configured to send a first broadcast message scrambled with the identity information of the first beam, through the first beam.

In the embodiments of the disclosure, the network device may send the identity information of a beam in a cell through a synchronization signal, and scramble a broadcast message corresponding to the synchronization signal with the identity information of the beam. Since the terminal device can acquire an identity of a beam through a synchronization signal sent by the network device and detect a corresponding broadcast message according to the identity of the beam, according to the embodiments, a common signal may be transmitted through multiple beams in a cell, thereby obtaining a beamforming gain, and finally improving the signal transmission quality.

Optionally, as an embodiment, the first broadcast message carries at least one of: relationship information between a first radio resource occupied by the first synchronization signal and a second radio resource occupied by the first broadcast message, identity information of at least one second beam in the first cell, information of a third radio resource occupied by a second synchronization signal sent through the at least one second beam in the first cell, a total number of beams in the first cell, or information of a fourth radio resource occupied by a second broadcast message sent through the at least one second beam in the first cell.

Optionally, as an embodiment, the first broadcast message carries identity information of the first cell.

It is to be understood that the network device according to an embodiment of the disclosure illustrated in FIG. 5 may correspond to the network device according to an embodiment of the disclosure illustrated in FIG. 4, and the above-mentioned and other operations and/or functions of the respective units in the network device according to an embodiment of the disclosure illustrated in FIG. 5 are respectively intended to implement the corresponding processes performed by the network device in the aforementioned method for transmitting the signal. For brevity, descriptions are not repeated herein.

Figure 6:
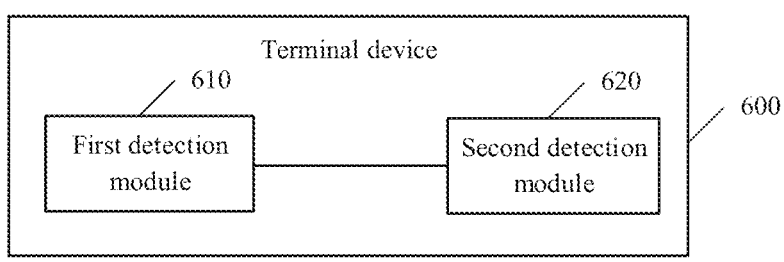
FIG. 6 is a schematic structure diagram of a terminal device according to an embodiment of the disclosure.

FIG. 6 is a schematic structure diagram of a terminal device according to an embodiment of the disclosure. It is to be understood that a terminal device 600 illustrated in FIG. 6 is only an example, and the terminal device according to an embodiment of the disclosure may further include other modules or units, or include modules functionally similar to those of the modules in FIG. 6, or not including all modules in FIG. 6.

A first detection module 610 is configured to detect a first synchronization signal in a first cell, herein, the first synchronization signal carries identity information of a first beam for sending the first synchronization signal.

A second detection module 620 is configured to detect a first broadcast message sent through the first beam, according to the identity information of the first beam.

In the embodiments of the disclosure, a synchronization signal received by the terminal device from the network device carries identity information of a beam in a cell. Thus, after acquiring an identity of a beam through a synchronization signal sent by the network device, the terminal device can detect a corresponding broadcast message according to the identity of the beam, so that a common signal may be transmitted through multiple beams in a cell, thereby obtaining a beamforming gain, and finally improving the signal transmission quality.

Optionally, as an embodiment, the first broadcast message carries at least one piece of information of: first relationship information between a first radio resource occupied by the first synchronization signal and a second radio resource occupied by the first broadcast message, identity information of at least one second beam in the first cell, information of a third radio resource occupied by a second synchronization signal sent through the at least one second beam in the first cell, a total number of beams in the first cell, or information of a fourth radio resource occupied by a second broadcast message sent through the at least one second beam in the first cell.

Optionally, as an embodiment, the terminal device further includes a processing module, configured to determine the identity information of the at least one second beam according to the at least one piece of information.

Optionally, as an embodiment, the first broadcast message carries identity information of the first cell.

Optionally, as an embodiment, the second detection module is specifically configured to: determine M second radio resources according to a first radio resource and a first relationship information set, herein, the first relationship information set includes M pieces of relationship information, $i^{th}$ relationship information in the first relationship information set is used to indicate a relationship between a radio resource occupied by a synchronization signal sent through the first beam and a radio resource occupied by a broadcast message sent through the first beam, in an $i^{th}$ cell of M cells, a relationship between an $i^{th}$ second radio resource of the M second radio resources and the first radio resource is the relationship indicated by the $i^{th}$ relationship information in the first relationship information set, M is a positive integer, i is a positive integer less than or equal to M, and the M cells include the first cell; descramble N broadcast messages on the M second radio resources with the identity information of the first beam, herein, N is a positive integer less than or equal to M; and detect the first broadcast message from K broadcast messages descrambled successfully, herein, K is a positive integer less than or equal to N.

Optionally, as an embodiment, K=1, where the second detection module is specifically configured to determine a broadcast message descrambled successfully as the first broadcast message.

Optionally, as an embodiment, K>1, where a $j^{th}$ broadcast message of the K broadcast messages carries relationship information between a radio resource occupied by the $j^{th}$ broadcast message and a radio resource occupied by a synchronization signal sent through the first beam in a cell where the $j^{th}$ broadcast message is located, j is a positive integer less than or equal to K. The second detection module is specifically configured to determine a third broadcast message of the K broadcast messages as the first broadcast message, herein, a relationship between a radio resource occupied by the third broadcast message and the first radio resource is the relationship information carried in the third broadcast message.

Optionally, as an embodiment, the first relationship information set is a pre-configured relationship information set.

It is to be understood that the above-mentioned and other operations and/or functions of the respective units in the terminal device according to an embodiment of the disclosure illustrated in FIG. 6 are respectively intended to implement the corresponding processes performed by the terminal device in the aforementioned method for transmitting the signal. For brevity, descriptions are not repeated herein.

Figure 7:
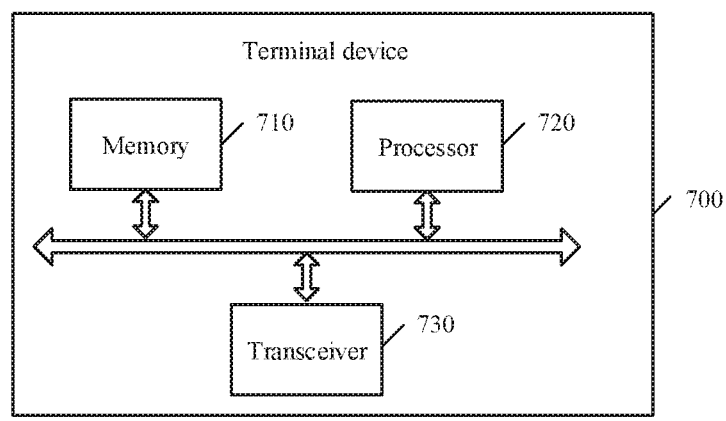
FIG. 7 is a schematic structure diagram of a terminal device according to an embodiment of the disclosure.

FIG. 7 is a schematic structure diagram of a terminal device according to an embodiment of the disclosure. The terminal device 700 includes a memory 710, a processor 720 and a transceiver 730.

The memory 710 is configured to store a program.

The processor 720 is configured to execute the program stored in the memory 710.

When executing the program stored in the memory 710, the processor 720 is specifically configured to detect a first synchronization signal in a first cell, herein, the first synchronization signal carries identity information of a first beam for sending the first synchronization signal.

The processor 720 is further configured to detect a first broadcast message sent through the first beam, according to the identity information of the first beam.

In the embodiments of the disclosure, a synchronization signal received by the terminal device from the network device carries identifier information of a beam in a cell. Thus, after acquiring an identity of a beam through a synchronization signal sent by the network device, the terminal device can detect a corresponding broadcast message according to the identity of the beam, so that a common signal may be transmitted through multiple beams in a cell, thereby obtaining a beam forming gain, and finally improving the signal transmission quality.

Optionally, as an embodiment, the first broadcast message carries at least one piece of information of: first relationship information between a first radio resource occupied by the first synchronization signal and a second radio resource occupied by the first broadcast message, identity information of at least one second beam in the first cell, information of a third radio resource occupied by a second synchronization signal sent through the at least one second beam in the first cell, a total number of beams in the first cell, or information of a fourth radio resource occupied by a second broadcast message sent through the at least one second beam in the first cell.

Optionally, as an embodiment, the processor 720 is further configured to determine the identity information of the at least one second beam according to the at least one piece of information.

Optionally, as an embodiment, the first broadcast message carries identity information of the first cell.

Optionally, as an embodiment, the processor 720 is specifically configured to: determine M second radio resources according to a first radio resource and a first relationship information set, herein, the first relationship information set includes M pieces of relationship information, $i^{th}$ relationship information in the first relationship information set is used to indicate a relationship between a radio resource occupied by a synchronization signal sent through the first beam and a radio resource occupied by a broadcast message sent through the first beam, in an $i^{th}$ cell of M cells, a relationship between an $i^{th}$ second radio resource of the M second radio resources and the first radio resource is the relationship indicated by the $i^{th}$ relationship information in the first relationship information set, M is a positive integer, i is a positive integer less than or equal to M, and the M cells include the first cell; descramble N broadcast messages on the M second radio resources with the identity information of the first beam, herein, N is a positive integer less than or equal to M; and detect the first broadcast message from K broadcast messages descrambled successfully, herein, K is a positive integer less than or equal to N.

Optionally, as an embodiment, K=1, where the processor 720 is specifically configured to determine a broadcast message descrambled successfully as the first broadcast message.

Optionally, as an embodiment, K>1, where a $j^{th}$ broadcast message of the K broadcast messages carries relationship information between a radio resource occupied by the $j^{th}$ broadcast message and a radio resource occupied by a synchronization signal sent through the first beam in a cell where the $j^{th}$ broadcast message is located, herein, j is a positive integer less than or equal to K. The processor 720 is specifically configured to: determine a third broadcast message of the K broadcast messages as the first broadcast message, herein, a relationship between a radio resource occupied by the third broadcast message and the first radio resource is the relationship information carried in the third broadcast message.

Optionally, as an embodiment, the first relationship information set is a pre-configured relationship information set.

It is to be understood that the terminal device according to an embodiment of the disclosure illustrated in FIG. 7 may correspond to the terminal device according to an embodiment of the disclosure illustrated in FIG. 6, and the above-mentioned and other operations and/or functions of the respective units in the terminal device according to an embodiment of the disclosure illustrated in FIG. 7 are respectively intended to implement the corresponding processes performed by the terminal device in the aforementioned method for transmitting the signal. For brevity, descriptions are not repeated herein.

Those of ordinary skill in the art will appreciate that the units and algorithm operations of various examples described in combination with the embodiments disclosed herein can be implemented in electronic hardware or a combination of computer software and electronic hardware. Whether these functions are performed in the form of hardware or software depends on specific application and design constraints of the technical solution. Those skilled in the art can use different methods for implementing the described functions for each particular application, but such implementation should not be considered to be beyond the scope of the disclosure.

Those skilled in the art can clearly understand that for the convenience and brevity of the description, the specific working process of the system, device and unit described above may refer to the corresponding process in the foregoing method embodiment, and details are not described herein again.

In several embodiments provided by the disclosure, it is to be understood that the disclosed system, device and method may be implemented in other manners. For example, the device embodiments described above are merely illustrative. For example, the division of the unit is only a logical function division. In actual implementation, there may be another division manner. For example, multiple units or components may be combined or may be integrated into another system, or some features may be ignored or not executed. In addition, coupling or direct coupling or communication connection displayed or discussed may be indirect coupling or communication connection between devices or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solutions of the embodiments.

In addition, each functional unit in each embodiment of the disclosure may be integrated into one processing unit, or each unit may exist physically separately, or two or more units may be integrated into one unit.

The functions may be stored in a computer-readable storage medium if being implemented in the form of a software functional unit and sold or used as a standalone product. Based on such understanding, the essence of the technical solution of the disclosure or a part contributing to the prior art or a part of the technical solution may be embodied in the form of a software product, which is stored in a storage medium, including a plurality of instructions used to cause a computer device (which may be a personal computer, server, or network device, etc.) to perform all or part of the operations of the methods described in various embodiments of the disclosure. The foregoing storage medium includes: a U disk, a mobile hard disk, a Read-Only Memory (ROM), a Random Access Memory (RAM), a magnetic disk, or an optical disk, and the like, which may store a program code.

The above is only the specific implementation manner of the disclosure, but the scope of protection of the disclosure is not limited thereto. Any person skilled in the art can easily think of changes or replacements within the technical scope disclosed by the disclosure, which should be covered by the scope of protection of the disclosure. Therefore, the scope of protection of the disclosure should be determined by the scope of protection of the claims.

What is claimed is:

1. A method for transmitting a signal, comprising:
    sending, by a network device, a first synchronization signal of a first cell through a first beam, the first synchronization signal carrying identity information of the first beam; and
    sending, by the network device through the first beam, a first broadcast message scrambled with the identity information of the first beam, the first broadcast message carrying: at least one of a location of a time domain resource or a location of a frequency domain resource occupied by a second synchronization signal sent through at least one second beam in the first cell, and identity information of at least one second beam in the first cell;
    wherein at least one of the following applies: a time domain resource for the first synchronization signal sent through the first beam in the first cell is different from a time domain resource for the first broadcast message sent through the first beam in the first cell, or, a frequency domain resource for the first synchronization signal sent through the first beam in the first cell is different from a frequency domain resource for the first broadcast message sent through the first beam in the first cell, and wherein at least one of the following applies: relationship information between the time domain resource for the first synchronization signal and the time domain resource for the first broadcast message is preset, or, relationship information between the frequency domain resource for the first synchronization signal and the frequency domain resource for the first broadcast message is preset, and wherein at least one of the following applies: the relationship information between the time domain resource for the first synchronization signal and the time domain resource for the first broadcast message comprises: an offset between a location of the time domain resource for the first synchronization signal and a location of the time domain resource for the first broadcast message, or, the relationship information between the frequency domain resource for the first synchronization signal and the frequency domain resource for the first broadcast message comprises: an offset between a location of the frequency domain resource for the first synchronization signal and a location of the frequency domain resource for the first broadcast message.

2. The method of claim 1, wherein the first broadcast message further carries at least one of: relationship information between a radio resource occupied by the first synchronization signal and a radio resource occupied by the first broadcast message, or a total number of beams in the first cell.

3. The method of claim 1, wherein the first broadcast message further carries identity information of the first cell.

4. A method for transmitting a signal, comprising:
  detecting, by a terminal device, a first synchronization signal in a first cell, the first synchronization signal carrying identity information of a first beam for sending the first synchronization signal; and
  detecting, by the terminal device, a first broadcast message sent through the first beam, according to the identity information of the first beam, the first broadcast message carrying: at least one of a location of a time domain resource or a location of a frequency domain resource occupied by a second synchronization signal sent through at least one second beam in the first cell, and identity information of at least one second beam in the first cell;
  wherein at least one of the following applies: a time domain resource for the first synchronization signal sent through the first beam in the first cell is different from a time domain resource for the first broadcast message sent through the first beam in the first cell, or, a frequency domain resource for the first synchronization signal sent through the first beam in the first cell is different from a frequency domain resource for the first broadcast message sent through the first beam in the first cell, and
  wherein at least one of the following applies: relationship information between the time domain resource for the first synchronization signal and the time domain resource for the first broadcast message is preset, or, relationship information between the frequency domain resource for the first synchronization signal and the frequency domain resource for the first broadcast message is preset, and
  wherein at least one of the following applies: the relationship information between the time domain resource for the first synchronization signal and the time domain resource for the first broadcast message comprises: an offset between a location of the time domain resource for the first synchronization signal and a location of the time domain resource for the first broadcast message, or, the relationship information between the frequency domain resource for the first synchronization signal and the frequency domain resource for the first broadcast message comprises: an offset between a location of the frequency domain resource for the first synchronization signal and a location of the frequency domain resource for the first broadcast message.

5. The method of claim 4, wherein the first broadcast message further carries at least one piece of information of: first relationship information between a radio resource occupied by the first synchronization signal and a radio resource occupied by the first broadcast message, or a total number of beams in the first cell.

6. The method of claim 5, further comprising:
  determining, by the terminal device, the identity information of the at least one second beam according to the at least one piece of information.

7. The method of claim 4, wherein the first broadcast message further carries identity information of the first cell.

8. The method of claim 4, wherein detecting, by the terminal device, the first broadcast message according to the identity information of the first beam comprises:
  determining, by the terminal device, M radio resources to be detected according to a radio resource occupied by the first synchronization signal and a first relationship information set, the first relationship information set comprising M pieces of relationship information, ith relationship information in the first relationship information set being used to indicate a relationship between a radio resource occupied by a synchronization signal sent through the first beam and a radio resource occupied by a broadcast message sent through the first beam, in an $i^{th}$ cell of M cells, a relationship between an $i^{th}$ radio resource to be detected of the M radio resources to be detected and the radio resource occupied by the first synchronization signal being the relationship indicated by the $i^{th}$ relationship information in the first relationship information set, M being a positive integer, i being a positive integer less than or equal to M, and the M cells comprising the first cell;
  descrambling, by the terminal device, N broadcast messages on the M radio resources to be detected with the identity information of the first beam, N being a positive integer less than or equal to M; and
  detecting, by the terminal device, the first broadcast message from K broadcast messages descrambled successfully, K being a positive integer less than or equal to N.

9. The method of claim 8, wherein K=1, and
  detecting, by the terminal device, the first broadcast message from K broadcast messages descrambled successfully comprises:
  determining, by the terminal device, a broadcast message descrambled successfully as the first broadcast message.

10. The method of claim 8, wherein K>1, and
a $j^{th}$ broadcast message of the K broadcast messages carries relationship information between a radio resource occupied by the $j^{th}$ broadcast message and a radio resource occupied by a synchronization signal sent through the first beam in a cell where the $j^{th}$ broadcast message is located, j being a positive integer less than or equal to K;

wherein detecting, by the terminal device, the first broadcast message from K broadcast messages descrambled successfully comprises:

determining, by the terminal device, a third broadcast message of the K broadcast messages as the first broadcast message, a relationship between a radio resource occupied by the third broadcast message and the radio resource occupied by the first synchronization signal being the relationship information carried in the third broadcast message.

11. The method of claim 8, wherein the first relationship information set is a pre-configured relationship information set.

12. A network device, comprising:
a transceiver, configured to send a first synchronization signal of a first cell through a first beam, the first synchronization signal carrying identity information of the first beam; and
to send a first broadcast message scrambled with the identity information of the first beam, through the first beam, the first broadcast message carrying: at least one of a location of a time domain resource or a location of a frequency domain resource occupied by a second synchronization signal sent through at least one second beam in the first cell, and identity information of at least one second beam in the first cell;
wherein at least one of the following applies: a time domain resource for the first synchronization signal sent through the first beam in the first cell is different from a time domain resource for the first broadcast message sent through the first beam in the first cell, or, a frequency domain resource for the first synchronization signal sent through the first beam in the first cell is different from a frequency domain resource for the first broadcast message sent through the first beam in the first cell, and
wherein at least one of the following applies: relationship information between the time domain resource for the first synchronization signal and the time domain resource for the first broadcast message is preset, or, relationship information between the frequency domain resource for the first synchronization signal and the frequency domain resource for the first broadcast message is preset, and
wherein at least one of the following applies: the relationship information between the time domain resource for the first synchronization signal and the time domain resource for the first broadcast message comprises: an offset between a location of the time domain resource for the first synchronization signal and a location of the time domain resource for the first broadcast message, or, the relationship information between the frequency domain resource for the first synchronization signal and the frequency domain resource for the first broadcast message comprises: an offset between a location of the frequency domain resource for the first synchronization signal and a location of the frequency domain resource for the first broadcast message.

13. The network device of claim 12, wherein the first broadcast message further carries at least one of: relationship information between a first radio resource occupied by the first synchronization signal and a second radio resource occupied by the first broadcast message, or a total number of beams in the first cell.

14. The network device of claim 12, wherein the first broadcast message further carries identity information of the first cell.

15. A terminal device, comprising:
a processor; and
a memory for storing instructions, when executed by the processor, cause the processor to detect a first synchronization signal in a first cell, the first synchronization signal carrying identity information of a first beam for sending the first synchronization signal; and
detect a first broadcast message sent through the first beam, according to the identity information of the first beam, the first broadcast message carrying: at least one of a location of a time domain resource or a location of a frequency domain resource occupied by a second synchronization signal sent through at least one second beam in the first cell, and identity information of at least one second beam in the first cell;
wherein at least one of the following applies: a time domain resource for the first synchronization signal sent through the first beam in the first cell is different from a time domain resource for the first broadcast message sent through the first beam in the first cell, or, a frequency domain resource for the first synchronization signal sent through the first beam in the first cell is different from a frequency domain resource for the first broadcast message sent through the first beam in the first cell, and
wherein at least one of the following applies: relationship information between the time domain resource for the first synchronization signal and the time domain resource for the first broadcast message is preset, or, relationship information between the frequency domain resource for the first synchronization signal and the frequency domain resource for the first broadcast message is preset, and
wherein at least one of the following applies: the relationship information between the time domain resource for the first synchronization signal and the time domain resource for the first broadcast message comprises: an offset between a location of the time domain resource for the first synchronization signal and a location of the time domain resource for the first broadcast message, or, the relationship information between the frequency domain resource for the first synchronization signal and the frequency domain resource for the first broadcast message comprises: an offset between a location of the frequency domain resource for the first synchronization signal and a location of the frequency domain resource for the first broadcast message.

16. The terminal device of claim 15, wherein the first broadcast message further carries at least one piece of information of: first relationship information between a first radio resource occupied by the first synchronization signal and a second radio resource occupied by the first broadcast message, or a total number of beams in the first cell.

17. The terminal device of claim 16, wherein the processor is further configured to determine the identity information of the at least one second beam according to the at least one piece of information.

18. The terminal device of any one of claim 15, wherein the first broadcast message further carries identity information of the first cell.

19. The terminal device of claim 15, wherein the processor is further configured to:
determine M second radio resources according to a first radio resource and a first relationship information set, the first relationship information set comprising M pieces of relationship information, $i^{th}$ relationship information in the first relationship information set being used to indicate a relationship between a radio resource occupied by a synchronization signal sent through the first beam and a radio resource occupied by a broadcast message sent through the first beam, in an $i^{th}$ cell of M cells, a relationship between an $i^{th}$ second radio resource of the M second radio resources and the first radio resource being the relationship indicated by the $i^{th}$ relationship information in the first relationship information set, M being a positive integer, i being a positive integer less than or equal to M, and the M cells comprising the first cell;
descramble N broadcast messages on the M second radio resources with the identity information of the first beam, N being a positive integer less than or equal to M; and
detect the first broadcast message from K broadcast messages descrambled successfully, K being a positive integer less than or equal to N.

20. The terminal device of claim 19, wherein K=1, and the processor is further configured to determine a broadcast message descrambled successfully as the first broadcast message.

21. The terminal device of claim 19, wherein K>1, and a $j^{th}$ broadcast message of the K broadcast messages carries relationship information between a radio resource occupied by the $j^{th}$ broadcast message and a radio resource occupied by a synchronization signal sent through the first beam in a cell where the $j^{th}$ broadcast message is located, j being a positive integer less than or equal to K;
wherein the processor is further configured to determine a third broadcast message of the K broadcast messages as the first broadcast message, a relationship between a radio resource occupied by the third broadcast message and the first radio resource being the relationship information carried in the third broadcast message.

22. The terminal device of claim 19, wherein the first relationship information set is a pre-configured relationship information set.

23. The method of claim 1, wherein the first broadcast message further carries information of a radio resource occupied by a second broadcast message sent through at least one second beam in the first cell.

24. The method of claim 4, wherein the first broadcast message further carries information of a radio resource occupied by a second broadcast message sent through at least one second beam in the first cell.

25. The network device of claim 12, wherein the first broadcast message further carries information of a radio resource occupied by a second broadcast message sent through the at least one second beam in the first cell.

26. The terminal device of claim 15, wherein the first broadcast message further carries information of a radio resource occupied by a second broadcast message sent through the at least one second beam in the first cell.

* * * * *